United States Patent [19]

Brundler

[11] 4,041,787

[45] Aug. 16, 1977

[54] GEAR UNIT FOR THE TRANSFORMATION OF A UNIFORM ROTARY MOVEMENT TO A STEP OR STROKE MOVEMENT

[76] Inventor: Hans Josef Brundler, Kantonstraase, CH-8863 Buttikon, Switzerland

[21] Appl. No.: 570,763

[22] Filed: Apr. 24, 1975

[30] Foreign Application Priority Data

Apr. 25, 1975 Germany .............................. 2420116

[51] Int. Cl.² .......................................... F16H 29/04
[52] U.S. Cl. .......................................... 74/117; 17/35
[58] Field of Search ....................... 74/117, 121, 571; 192/33

[56] References Cited

U.S. PATENT DOCUMENTS

| 1,787,289 | 12/1930 | Thomas .................................. 74/117 |
| 2,021,831 | 11/1935 | Brightbill ................................. 17/35 |
| 2,400,663 | 5/1946 | Tennant ............................. 192/33 R |
| 2,521,711 | 9/1950 | Galliano ................................. 74/117 |
| 2,834,223 | 5/1958 | Strnad .................................... 74/117 |
| 3,052,915 | 9/1962 | Möller ..................................... 17/35 |
| 3,213,697 | 10/1965 | Hartmann et al. .................... 74/117 |
| 3,769,657 | 11/1973 | Müller .................................... 17/35 |

FOREIGN PATENT DOCUMENTS 843,641   7/1952   Germany ........................... 192/33 R Primary Examiner—Samuel Scott
Assistant Examiner—Wesley S. Ratliff, Jr.
Attorney, Agent, or Firm—Albert L. Jeffers; Roger M. Rickert

[57] ABSTRACT

A geared transmission having a continuously rotating input shaft and having output members, one of which is intermittently driven at variable speeds and the other of which is intermittently driven during idle periods of the first driven member. The unit includes an arrangement for bypassing the intermittent drive of the first driven member so that it can be driven continuously by the input shaft.

11 Claims, 5 Drawing Figures

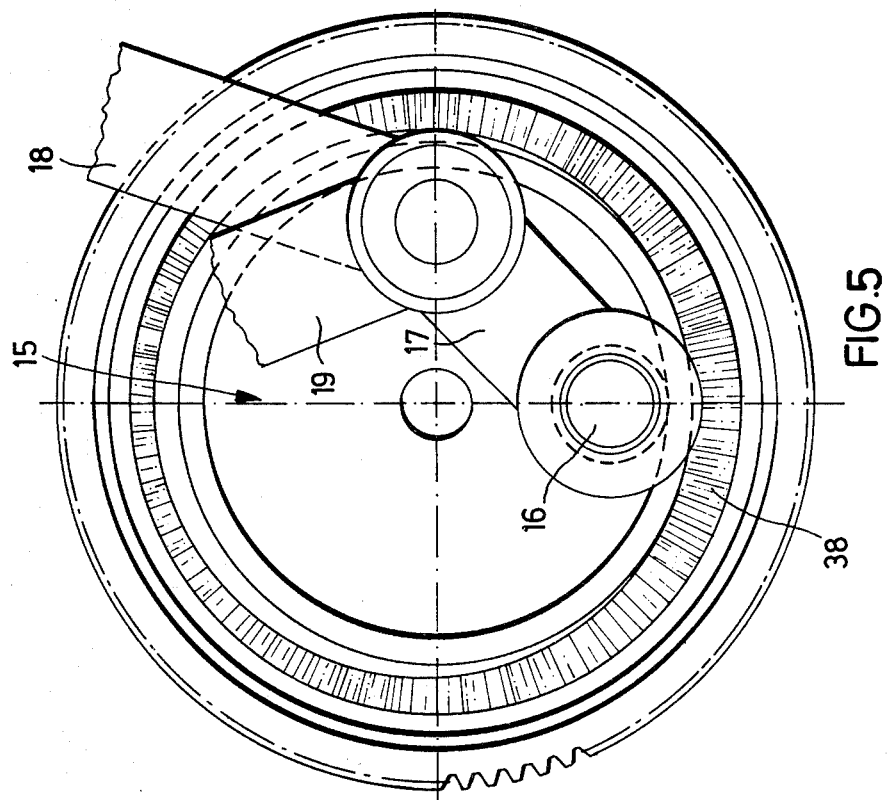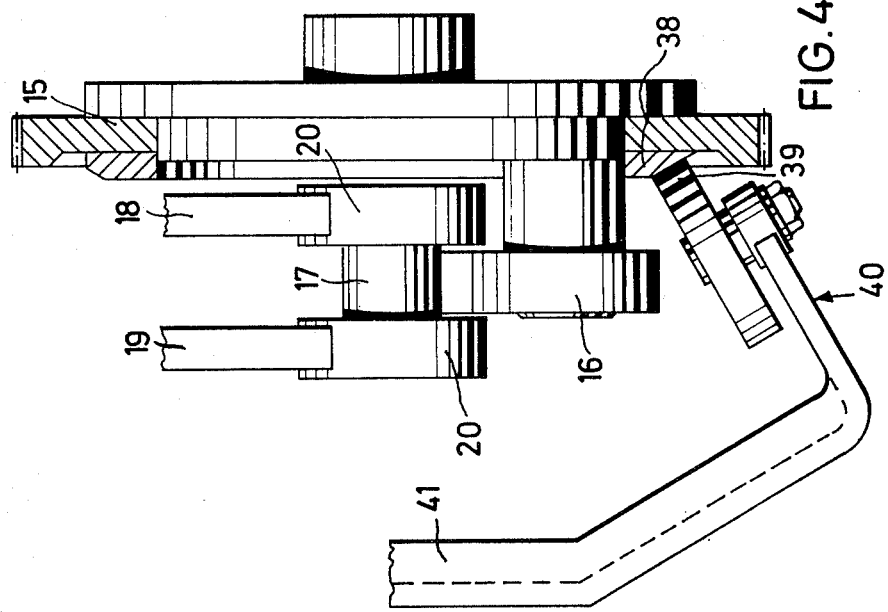

GEAR UNIT FOR THE TRANSFORMATION OF A UNIFORM ROTARY MOVEMENT TO A STEP OR STROKE MOVEMENT

The present invention relates to a geared unit, especially for the conversion of uniform rotary motion into intermittent and variable speed rotary motion. In particular, the present invention refers to a geared unit to be interposed between a constant speed drive motor and a driven device such as a conveyor to effect intermittent driving of the conveyor at variable speed and including a provision for further treatment of the conveyed material after conveying thereof.

Geared units of the nature referred to are known and, in every case, must comply with relatively specific requirements. For example, such geared units are sometimes employed for proportioning materials, and such proportioning must often be accomplished with a high degree of accuracy, say, for example, an accuracy of within 1 percent by weight.

Such proportioning might occur in connection, for example, with the manufacture of sausages and the like. The proportioning must occur continuously and repetitively and the geared unit must, thus, be highly reliable. It is, furthermore, important for such units to be capable of relatively inexpensive production and to be capable of withstanding abuse to which the units are exposed in the form of vibration, moisture and rough treatment.

Geared units of the nature referred to have been made which include electronic controls, but the conditions of operation of such units vary so widely that it is difficult to maintain accuracy with an electronic device and, accordingly, mechanically operating units and mechanically adjustable controls are preferred.

An object of the present invention is the provision of a geared unit which is converting continuous rotary motion into intermittent rotary motion and infinitely adjustable with respect to the intermittent rotary motion and entirely mechanical in nature.

A further object is the provision of a unit of the nature referred to which is highly reliable and has a long life.

A still further object is the provision of a geared unit of the nature referred to which is easy to adjust.

BRIEF SUMMARY OF THE INVENTION

In the particular device illustrated in the present application, a rotary conveyor is provided which rotates in one direction for extruding material which may, for example, be a foodstuff such as sausage material. In particular, with the extrusion of sausage material, it is desirable to pinch off or form a twist in the extruded product to make, for example, individual sausage elements.

It is, furthermore, important that the individual elements be very close to one another in weight. According to the present invention, a continuously driven and preferably constant speed input shaft is provided which drives a rotary element having eccentric crank pin mounted thereon. A link is provided having one end rotatably connected to the crank pin and a pair of connecting rods are provided, each having one end pivotally connected to the other end of the link.

One connecting rod has the other end thereof pivotally connected to an adjustable anchor member while the other end of the other connecting rod is connected to a pivotally mounted gear sector for oscillation of the gear sector as the connecting rod reciprocates due to rotation of the rotary element.

The gear sector meshes with a pinion which is connected with the output member, which is in the form of a conveyor, by a one-way clutch so that the conveyor is driven in only one direction of reciprocation of the connecting rod.

The amount by which the conveyor is driven is variable by adjusting the aforementioned anchor member which, for the purpose of adjustment, is mounted on the end of a pivotally supported lever. A worm drive associated with the lever is adjustable for tilting the lever thereby to move the anchor member.

The connecting rods are advantageously of the same length and when the anchor member is adjusted to position the connecting rods in superimposed aligned arrangement, no driving of the gear sector occurs during rotation of the rotary element. When, however, the anchor member is adjusted away from the aforementioned position, driving of the conveyor occurs and by an amount in conformity with the amount of adjustment of the anchor member.

A second driven member in the form of a shaft is provided which is connected with the input shaft by means of a chain drive and a clutch. The clutch is normally disengaged and a lever is provided for actuating the clutch into engaged position. The lever has a roller bearing on the aforementioned rotary element and the rotary element has a cam rise formed thereon for actuating the lever during the interval that the conveyor is idle.

Thus, a drive cycle of the conveyor will result in the extrusion of a certain amount of material, for example, sausage material into a casing, and during the idle interval of the conveyor, while no extrusion is taking place, the second driven member is actuated and effects cutting off or twisting of the extruded material, preferably, immediately adjacent the exit end of the conveyor.

When the device is continuously operating, it will be evident that a highly accurate product can be produced repetitively and quite rapidly.

The exact nature of the present invention will become more clearly apparent upon reference to the following detailed specification taken in connection with the accompanying drawings in which:

FIG. 4 is a view looking in at the side of a portion of the device showing an intermittently movable lever for operating a clutch device.

FIG. 5 is a view looking in from the left side of FIG. 4.

Figure 1:
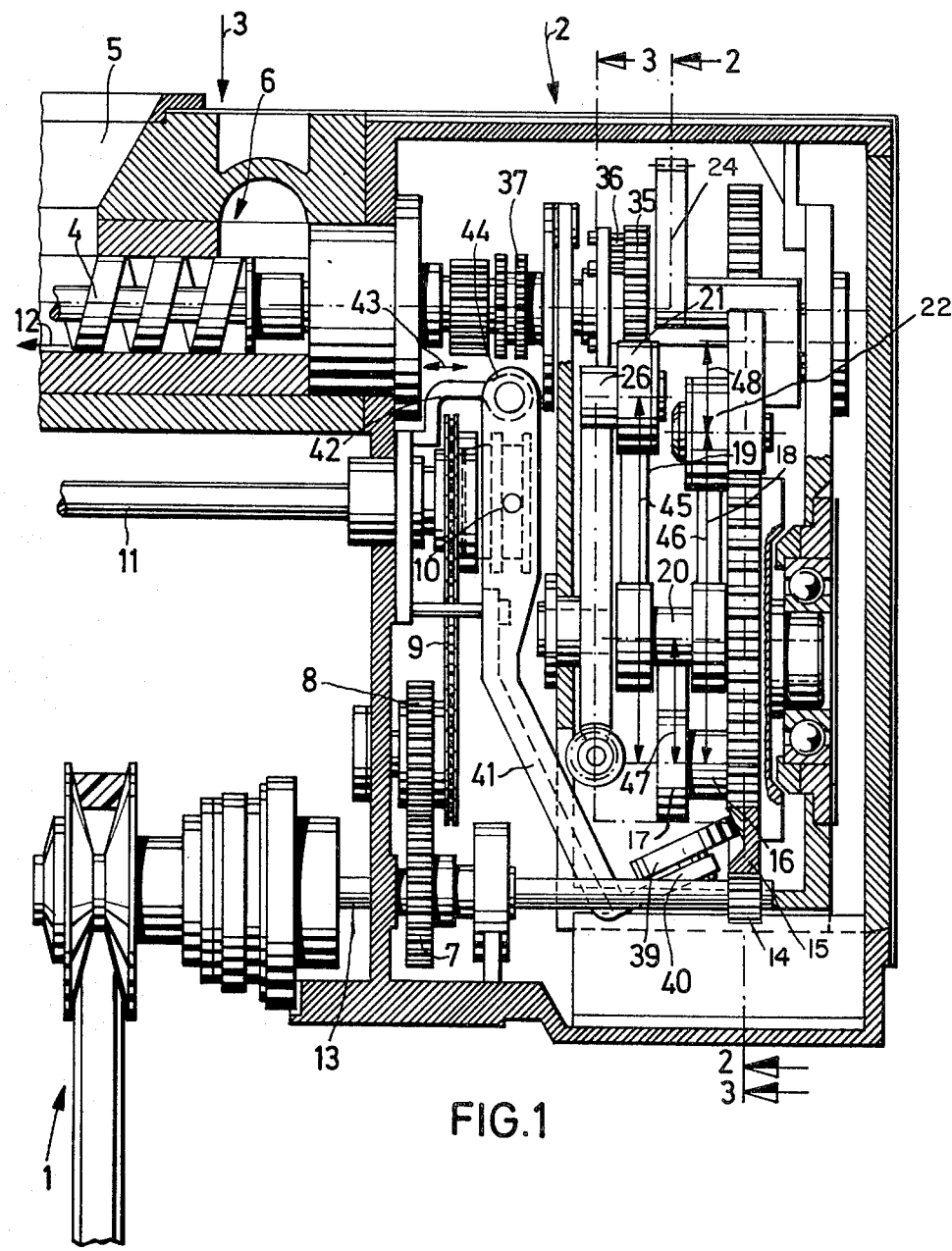
FIG. 1 is a view of a geared unit according to the present invention with the casing in which the unit is mounted in cross section.

DETAILED DESCRIPTION OF THE INVENTION:

Referring to the drawings somewhat more in detail, the device of the present invention has an input shaft 13 which is continuously driven as by the drive 1 which may consist of a belt drive from an electric motor, preferably a constant speed electric motor, although either the motor may be adjustable in speed or the pulley drive may be adjustable as to drive ratio.

The drive unit according to the present invention is provided for the purpose of intermittently actuating a conveyor mechanism generally indicated by reference numeral 3. The conveyor mechanism comprises a rotary feed worm 4 which receives material through a funnel or hopper 5 and the region at 6 may be evacuated to prevent the conveyor from advancing air into the material being expressed therethrough by the worm 4. The worm 4 is arranged to rotate in one direction only and advances material leftwardly through the conveyor device as indicated by the arrow 12 in FIG. 1.

Shaft 13 has a first gear 7 thereon meshing with a gear 8 rotatably supported in the frame of the geared unit and to which is connected a sprocket that drives a chain 9 that is entrained over a further sprocket which is rotatable on a shaft 11. A clutch mechanism generally indicated at 10 is normally in position to disengage the last-mentioned sprocket from shaft 11, but when engaged, effects driving connection between the said sprocket and shaft 11 so that shaft 11 is, at that time, driven in rotation by input shaft 13.

Figure 2:
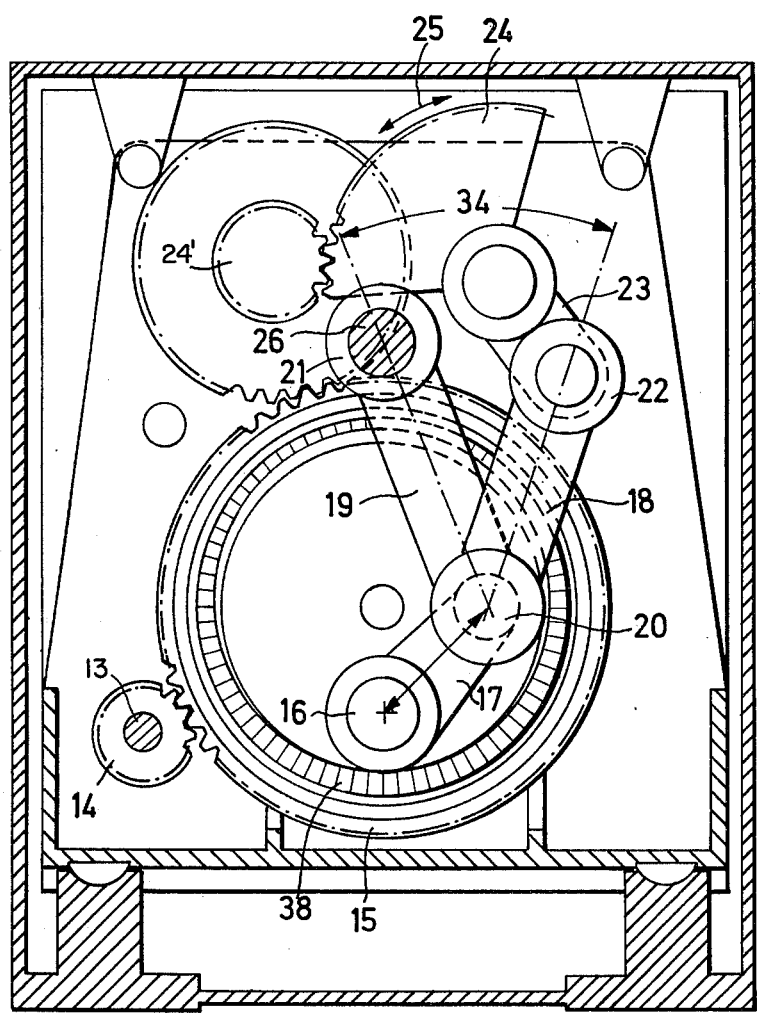
FIG. 2 is a sectional view indicated by line 2—2 on FIG. 1.

The input shaft 13, as will be seen in FIG. 2, carries a further gear or pinion 14 which meshes with an externally toothed rotary element 15. Rotary element 15 has ecentrically mounted thereon a crank pin 16 which pivotally engages one end of a drag 17, the other end of which is pivotally connected to the driving ends 20 of a pair of axially spaced connecting rods 18 and 19.

The first connecting rod 18 has its free end 22 pivotally connected to the free end of a rocking lever 23 which is fixed to gear sector 24 pivotally supported in the frame of the geared unit. Gear sector 24 oscillates as indicated by arrow 25 and meshes with a pinion 24' which, as will be seen hereinafter, has a driving connection with conveyor worm 4.

Figure 3:
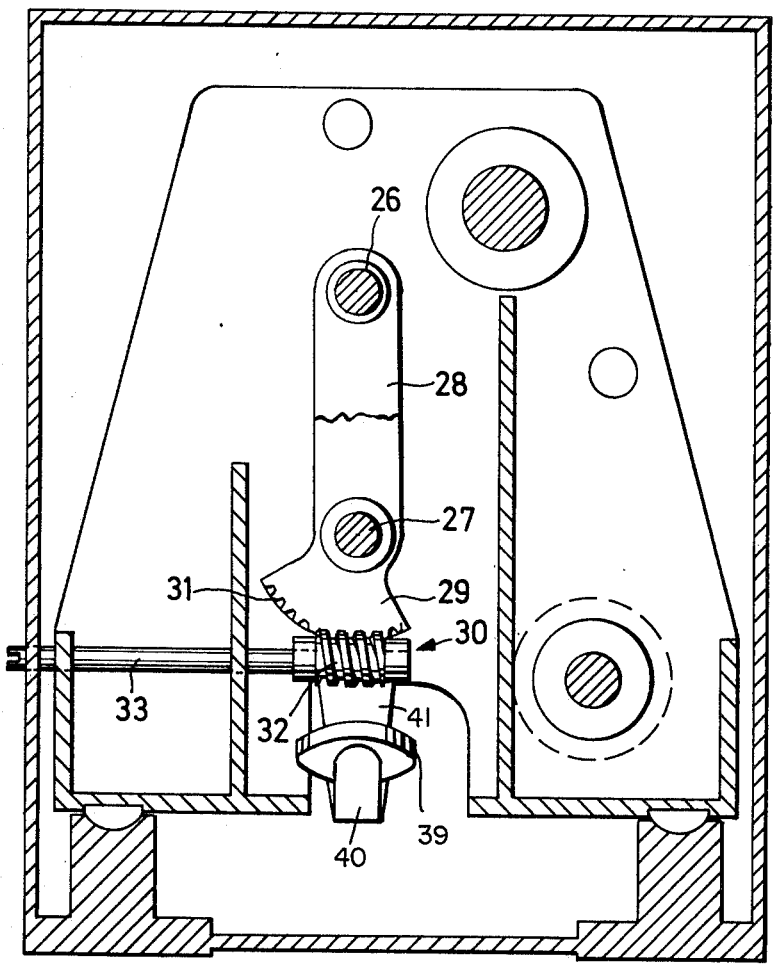
FIG. 3 is a further section indicated by line 3—3 on FIG. 1.

The free end 21 of the second connecting rod 19 is pivotally mounted on an anchor member 26 and which, as will be seen in FIG. 3, is carried on the outer end of a lever 28 pivotally supported on pivot member 27 carried by the frame of the geared unit. The end of lever 28 opposite the end on which anchor member 26 is mounted has worm teeth 31 thereon and meshing therewith is a worm 32 which is mounted on a shaft 33 rotatably supported in the frame and angularly adjustable from externally of the frame.

When support arm 28 is adjusted about its pivotal support 27, anchor member 26 is movable in an arcuate path, for example, over the angular range indicated by numeral 34 in FIG. 2. When anchor member 26 is positioned so as substantially to coincide in the axial direction with the pivotal connection between connecting rod 18 and rocking lever 23, rotation of rotatable element 15 will not produce any oscillatory movement of gear sector 24. As anchor member 26 is adjusted toward its FIG. 2 position, however, oscillation of gear sector 24 is first initiated and then increases so that the amount of oscillation of pinion 24' also increases.

Pinion 24' is geared to or otherwise operatively connected to drive gear 35 for worm 4 and interposed between drive gear 35 and the shaft on which worm 4 is mounted is a one-way clutch 36 so that worm 4 will be driven only in one direction.

It will, thus, be seen that in one direction of movement of the first connecting rod 18 and causing oscillation of gear sector 24 in one direction, worm 4 will be driven, but in the other direction of movement of the first connecting rod 18 and during which gear sector 24 oscillates in the opposite direction, the worm will not be driven.

The worm drive shaft may also be provided with gearing or sprockets as indicated at 37 and which may be selectively connected to input shaft 13 for effecting continuous rotation of worm 4 in the expressing direction thereof. Such a connection might be made, for example, to purge the extrusion device when it was desired to run a different material therethrough.

As has been mentioned, the shaft 11 is arranged to be actuated while the worm 4 is idle and not rotating. This accomplished by providing a lever 41 which is pivotally supported on a bracket 42 by pivot means 44 and connected to clutch 10 so that the lever will actuate the clutch into engaged position when tilted about the pivotal support thereof. Lever 41 has an offset portion 40 at the free end which carries a roller 39 bearing on a cam surface 38 formed on the side of rotary element 15.

Cam surface 38 is provided with a cam rise for actuating lever 41 thereby to actuate clutch 10 into engaged position. The cam rise is so disposed peripherally on rotary element 15 that the worm 4 is in nonrotating idle condition at the time that lever 41 is tilted to cause clutch 10 to engage.

The intermittent actuation of shaft 11 alternately with the intermittent and variable speed actuation of worm 4 permits the maintaining of a continuous cycle in which extrusion of material is followed by physical treatment of the material at the exit end of the extrusion device, such physical treatment of the material taking the form of cutting off the extruded material into links, or the twisting of the material to form individual links thereof within a continuous casing as in the case of a sausage product.

What is claimed is:

1. A geared transmission for converting continuous rotary motion into intermittent and adjustable motion and comprising; a frame, an input shaft in said frame adapted for being driven continuously in one direction, a rotary element in said frame continuously coupled to said input shaft, a crank pin eccentrically located on said rotary element, a link having one end connected to said crank pin, first and second reciprocable connecting rods each having one end pivotally connected to the other end of said link, a rotary driven member in said frame, drive means including a one-way drive clutch connecting said driven member to the other end of said first connecting rod so the driven member is driven in one direction of movement of the first connecting rod and is stationary in the other direction of movement thereof, an anchor member connected to the other end of said second connecting rod, and means supporting the anchor member in the frame for adjustment of the position of said anchor member to adjust the stroke of said first connecting rod.

2. A geared transmission according to claim 1 which includes a support arm in the frame, said anchor member being mounted on one end of the arm.

3. A geared transmission according to claim 2 which said support arm is pivotally supported in said frame at a point spaced from said anchor member, and adjusting means for adjusting the angular position of said support arm on the pivotal support thereof thereby to adjust the position of said anchor member.

4. A geared transmission according to claim 3 in which said adjusting means comprises worm teeth on the end of said support arm opposite the anchor member, and a worm rotatably supported in said frame and meshing with said worm teeth on said support arm.

5. A geared transmission according to claim 1 in which said drive means includes a gear sector pivotally mounted in said frame, a rocking lever fixed to said gear sector and having the free end connected to said other end of said first connecting rod, a pinion meshing with said gear sector, and connecting means connecting said pinion to said driven member.

6. A geared transmission according to claim 5 in which said connecting means comprises said one-way clutch for driving of said driven member in any one direction of movement of said gear sector as the gear sector is oscillated by said first connecting rod.

7. A geared transmission according to claim 5 in which the lengths of said link, said first connecting rod, said second connecting rod, and said rocking lever are in the ratio of 1:1.39: 2.26:2.26:093.

8. A geared transmission according to claim 1 in which said rotary element has a cam rise formed thereon, a lever pivoted in the frame and having an end in the path of said cam rise for tilting of the lever as said rotary element rotates, a driven shaft, and a drive including a clutch connecting the driven shaft to said input shaft, tilting of said lever actuating said clutch into drive position.

9. A geared transmission according to claim 8 in which said cam rise is located on said rotary element so as to actuate said clutch into drive position while said driven member is stationary.

10. A geared transmission according to claim 9 in which said driven member comprises an extrusion conveyor having an exit end and said driven shaft is adapted for actuating a device for physical treatment of the material at the exit end of the conveyor.

11. A geared transmission according to claim 1 which includes means for selectively connecting said input shaft directly with said driven member.

* * * * *

UNITED STATES PATENT AND TRADEMARK OFFICE
CERTIFICATE OF CORRECTION

PATENT NO. : 4,041,787
DATED : August 27, 1977
INVENTOR(S) : Hans Josef Brundler It is certified that error appears in the above-identified patent and that said Letters Patent are hereby corrected as shown below:

Col. 3, line 26, "link" omitted between "drag" and "17".

Col. 3, line 31 "a" omitted between "to" and "gear".

Col. 4, line 12, "is" omitted before "accomplished".

Col. 4, line 60 (Claim 3) "in" omitted between "2" and "which"

Col. 5, line 18 (Claim 7) "2.26:2.26:093" should be
--2.26:2.26:0.93 --.

Signed and Sealed this

Thirteenth Day of December 1977

[SEAL]

Attest:

RUTH C. MASON
Attesting Officer

LUTRELLE F. PARKER
Acting Commissioner of Patents and Trademarks